United States Patent
Zhang et al.

(10) Patent No.: US 12,432,101 B2
(45) Date of Patent: Sep. 30, 2025

(54) MODULATION CLASSIFICATION AND DEMODULATION SYSTEM WITH A NEURAL NETWORK

(71) Applicant: University of Dayton, Dayton, OH (US)

(72) Inventors: Shuo Zhang, Washington Township, OH (US); Tarek M. Taha, Centerville, OH (US); Chris Yakopcic, Washington Township, OH (US)

(73) Assignee: UNIVERSITY OF DAYTON, Dayton, OH (US)

( * ) Notice: Subject to any disclaimer, the term of this patent is extended or adjusted under 35 U.S.C. 154(b) by 40 days.

(21) Appl. No.: 18/593,861

(22) Filed: Mar. 1, 2024

(65) Prior Publication Data
US 2024/0430144 A1     Dec. 26, 2024

Related U.S. Application Data

(60) Provisional application No. 63/449,154, filed on Mar. 1, 2023.

(51) Int. Cl.
*H04L 27/00* (2006.01)
*H04L 27/26* (2006.01)

(52) U.S. Cl.
CPC ...... *H04L 27/0012* (2013.01); *H04L 27/2688* (2013.01)

(58) Field of Classification Search
CPC .............. H04L 27/0012; H04L 27/2688
See application file for complete search history.

(56) References Cited

U.S. PATENT DOCUMENTS

| | | | |
|---|---|---|---|
| 8,295,409 B1 * | 10/2012 | Su | H04L 27/0012 375/342 |
| 2023/0284139 A1 * | 9/2023 | Ma | H04B 7/0626 370/329 |
| 2024/0022927 A1 * | 1/2024 | Tong | H04W 4/40 |

FOREIGN PATENT DOCUMENTS

| CN | 113872904 A | * 12/2021 |
|---|---|---|
| KR | 20230173452 A | * 12/2023 |

OTHER PUBLICATIONS

Lee, Junghwan et al, "Deep neural network-based blind modulation classification for fading channels," International Conference on Information and Communication Technology Convergence (ICTC), 2017, pp. 551-554, Jeju, South Korea.
(Continued)

*Primary Examiner* — Freshteh N Aghdam
(74) *Attorney, Agent, or Firm* — Taft Stettinius & Hollister LLP (57) ABSTRACT

A modulation classification and demodulation system is disclosed having a modulation classifier and a demodulator to classify modulations and then demodulate received signals that deviate during propagation from noise. The modulation classifier classifies each type of modulation for each signal transmitted to the receiver in a sequenced modulation signal into a corresponding modulation class based on a modulation classifier neural network that identifies each type of modulation. The sequenced modulation signal that is received by the modulation classifier is deviated from when initially transmitted by the transmitter based on noise that impacts the sequenced modulation signal as the sequenced modulation signal propagates from the transmitter. The demodulator demodulates the receives signal by decoding each symbol included in the received signal based on the determined modulation class of the received signal. The determined modulation class identifies each symbol in the
(Continued)

End-to-End DNN based Receiver determined modulation class to decode when deviated by noise.

20 Claims, 5 Drawing Sheets

(56) References Cited

OTHER PUBLICATIONS

Rajendran, Sreeraj et al, "Distributed deep learning models for wireless signal classification with distributed low-cost spectrum sensors." Transactions on Cognitive Communications and Networking vol. 4.3, 2018, pp. 433-445.
O'shea, Timothy et al, "Over-the-air deep learning based radio signal classification." IEEE Journal of Selected Topics in Signal Processing, vol. 12.1, 2018, pp. 168-179.
Huynh-The, Thien, et al. "MCNet: An efficient CNN architecture for robust automatic modulation classification." IEEE Communications Letters vol. 24.4, 2020, pp. 811-815.
Ghasemzadeh, Pejman, et al, "GS-QRNN: A high-efficiency automatic modulation classifier for cognitive radio IoT." IEEE Internet of Things Journal vol. 9.12, 2022, pp. 9467-9477, Lincoln, Nebraska.
Ahmad, Arhum, et al. "DeepDeMod: BPSK Demodulation Using Deep Learning Over Software-Defined Radio." IEEE Access, vol. 10, 2022, pp. 115833-115848.

* cited by examiner

| Modulation Classes |
| --- |
| BPSK |
| QPSK |
| 8PSK |
| 16PSK |
| 32PSK |
| DQPSK |
| OQPSK |
| 16APSK |
| 32APSK |
| 64APSK |
| 128APSK |
| 16QAM |
| 64QAM |
| 128QAM |
| 256QAM |
| FSK |
| GFSK |
| CPFSK |
| PAM4 |
| MSK |
| GMSK |
| B-FM |
| DSB-AM-WC |
| DSB-AM-SC |
| SSB-AM |

MODULATION CLASSIFICATION AND DEMODULATION SYSTEM WITH A NEURAL NETWORK

CROSS-REFERENCE TO RELATED APPLICATIONS

The present application is a U.S. Nonprovisional application of U.S. Provisional Application Ser. No. 63/449,154 filed Mar. 1, 2023, the disclosure of which is incorporated by reference in its entirety.

FIELD OF DISCLOSURE

The present disclosure relates to transmission of wireless communication signals, and specifically to a modulation classification and demodulation system to demodulate transmitted wireless communication signals with a neural network.

BACKGROUND OF THE INVENTION

Traditional wireless communication transmission systems transmit wireless communication signals that are impacted by noise as the wireless communication signals are transmitted from the transmitter to the receiver. The extent of the impact on the wireless communication signals by the noise results in the receiver failing to recognize the modulation in which the wireless communication signals are modulated as well as failing to recognize the symbols transmitted in the wireless communication signals. In doing so, the conventional receiver fails to correctly decode the wireless communication signals. Thus, conventional receiver technology is proving insufficient in applications that require the transmission of wireless communication signals in environments in which the wireless communication signals are susceptible to noise during propagation from the transceiver to the conventional receiver.

It is becoming common wisdom to use Automatic Modulation Classification (AMC) in which the type of modulation in which the wireless communication signal modulated is pre-emptively classified before the wireless communication signal is transmitted by the transmitter. In doing so, the conventional receiver pre-emptively identifies the modulation classification of the wireless communication signal thereby enabling the conventional receiver to identify the modulation of the wireless communication signal regardless of the impact of any noise.

Conventional receivers are pre-emptively trained to classify the modulation of the wireless communication signal before the wireless communication signal is transmitted. In doing so, the conventional receivers are pre-emptively trained based on numerous different variations in which the modulation of the wireless communication signal may be impacted by noise as the wireless communication signal propagates. The conventional receiver is limited to being pre-emptively trained to only the variations in which the modulation is impacted by noise that the conventional receiver is pre-emptively introduced to thereby preventing the conventional receiver from recognizing any other variation in which the modulation is impacted by noise.

For example, the conventional receiver is pre-emptively trained to classify hundreds of variations in which the modulation is impacted by noise. However, the modulation of the wireless transmission signal may be impacted in numerous other variations that the conventional receiver has not been pre-emptively trained to classify thereby resulting in the conventional receiver from failing to decode the wireless transmission signal. Therefore, an effective means to train receivers to classify the modulation of the wireless communication signal to accommodate for impacts of noise during transmission of the wireless communication signal is needed.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention. Additionally, the left most digit(s) of a reference number identifies the drawing in which the reference number first appears.

FIG. 4 is a schematic illustration of an automatic modulation classification system that implements one or more neural networks to learn the transmitted radio signal online in accordance with an embodiment of the disclosure.

DETAILED DESCRIPTION

The following Detailed Description refers to accompanying drawings to illustrate exemplary embodiments consistent with the present disclosure. References in the Detailed Description to "one embodiment," "an embodiment," "an exemplary embodiment," etc., indicate that the exemplary embodiment described can include a particular feature, structure, or characteristic, but every exemplary embodiment does not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other embodiments are possible, and modifications can be made to exemplary embodiments within the scope of the present disclosure. Therefore, the Detailed Description is not meant to limit the present disclosure. Rather, the scope of the present disclosure is defined only in accordance with the following claims and their equivalents.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not limitation, such that the terminology or phraseology of the present specification is to be interpreted by those skilled in relevant art(s) in light of the teachings herein.

The present invention creates a neural network based modulation classification and demodulation system with online training. A modulation classifier may classify the type of modulation in which a received signal is transmitted despite the received signal being impacted by noise during the transmission thereby impacting the classification of the modulation of the received signal. In doing so, the modulation classifier may identify the modulation of the received signal based on an identifier that pre-empts the received signal that identifies the modulation of the received signal thereby enabling the modulation classifier to identify the modulation despite the received signal being impacted by noise. The modulation classifier may then correctly classify the modulation of the received signal impacted by noise. The modulation classifier may then incorporate a modulation classifier neural network to train the modulation classifier neural network to correlate the received signal impacted by noise as having the modulation as classified by the modulation classifier. As a result, the modulation classifier may correctly classify the modulation of the received signal in subsequent transmissions as the received signal is impacted by noise.

The symbols included in the received signal may also be impacted by the noise in addition to the modulation of the received signal. The demodulator may determine the symbol type of the symbols included in the received signal based on the modulation class of the received signal as classified by the modulation classifier. The modulation class of the received signal may identify the symbol type that is modulated in the received signal thereby enabling the demodulator to identify the symbol type of the symbols included in the received signal. The demodulator may then correctly decode symbols included in the received signal due to the identification of the symbol type of the symbols. The demodulator may then incorporate a demodulator neural network to train the demodulator neural network to correlate the symbols included in the received signal that is impacted by noise as being the symbol type as identified based on the modulation as classified by the modulation classifier. As a result, the demodulator may correctly decode the symbols included in the received signal in subsequent transmissions as the received signal is impacted by noise.

Figure 1:
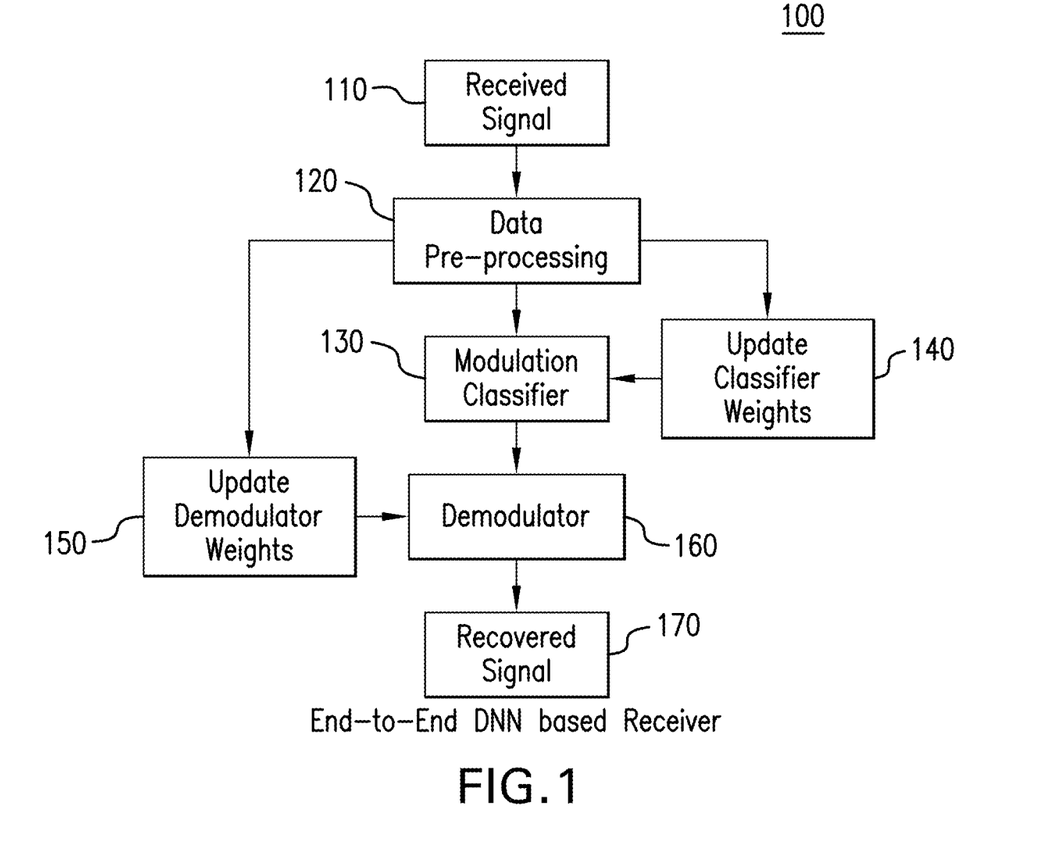
FIG. 1 is a schematic illustration of an exemplary end-to-end deep neural network (DNN) receiver that classifies a modulation as well as decodes symbols included in a received signal that is impacted by noise as the received signal propagates from a transmitter to a receiver in accordance with an embodiment of the disclosure.

Referring to FIG. 1, an end-to-end deep neural network (DNN) receiver 100 classifies a modulation as well as decodes symbols included in a received signal that is impacted by noise as the received signal propagates from a transmitter to a receiver. The modulation classification and demodulation system 100 includes a receiver 110 that receives a received signal, a data pre-processor 120 that conducts data pre-processing, a modulation classifier 130, a modulation classifier neural network 140 that updates classifier weights, a demodulator neural network 150 that updates demodulator weights 150, a demodulator 160, and a recovered signal 170.

The end-to-end DNN receiver 100 may implement a neural network for transmission of a wireless communication signal. A wireless communication signal is conventionally transmitted by a transmitter in which the transmitter modulates the data that is to be transmitted by the wireless communication signal such that the modulation associates symbols with the data and wirelessly transmits the wireless communication signal with the modulated data such that the wireless communication signal propagates from the transmitter to the conventional receiver. The conventional receiver then demodulates the wireless communication signal and decodes the symbols from the demodulation to recover the data transmitted by the wireless communication signal.

The wireless communication signal may engage noise as the wireless communication signal propagates from the transmitter to the conventional receiver. Initially at transmission by the transmitter, the transmitter modulates the data that is to be transmitted by the wireless communication such that the data is encoded into the modulation based on the type of modulation. The encoding of the data into the modulation based on the type of modulation enables the data to be encoded into the symbols such that the data may then be transmitted via the wireless communication signal as encoded into the symbols. However, as the wireless communication signal propagates from the transmitter to the conventional receiver, the wireless communication signal may be impacted by noise. In doing so, the initial modulation of the data as encoded into symbols based on the type of modulation to transmit the data via the wireless communication signal may deviate during the propagation from the transmitter to the conventional receiver due to the impact of noise.

The modulation as well as the symbols in which the data is encoded based on the type of modulation as initially transmitted by the transmitter may deviate during propagation to the conventional receiver due to the impact of noise. The deviation may be significant such that the deviation prevents the conventional receiver from classifying the type of modulation in which the wireless communication signal is modulated with the data as well as prevented from identifying the symbols in which the data is encoded onto the modulated wireless communication signal. As a result, the conventional receiver is unable to demodulate the wireless communication signal and then decode the symbols included in the wireless communication signal to determine the data initially encoded and modulated onto the wireless communication signal by the transmitter due to the impact of the noise on the wireless communication signal as the wireless signal propagated from the transmitter to the conventional receiver.

For example, a satellite orbits the earth in which a window to receive the wireless communication signal by a conventional receiver positioned at the Earth's surface is a time duration of seven minutes in each twenty-four hour period. The transmitter positioned on the satellite modulates the data to transmit onto the wireless communication signal and encodes the data into symbols based on the type of modulation in which the wireless communication signal is modulated with the data. As the seven minute window in the twenty-four hour period opens, the transmitter wirelessly transmits the wireless communication signal with the data modulated onto the wireless communication signal and the data is encoded into the symbols based on the type of modulation.

However, as the wireless communication signal propagates from the transmitter positioned on the satellite to the conventional receiver positioned on the earth's surface, the wireless communication signal is impacted by noise that deviates the modulation of the data as modulated onto the wireless communication signal as well as the symbols in which the data is encoded. As a result, the conventional receiver is unable to classify the modulation of the wireless communication signal to demodulate the wireless communication signal and then decode the symbols included in the wireless communication signal to determine the data initially encoded and modulated onto the wireless communication signal. The seven minute time duration to receive the wireless communication signal from the satellite then lapses and the next opportunity to receive the wireless communication signal from the satellite is then delayed until the next window opens in twenty-four hours.

The use of wireless communication has been growing significantly. This has required the use of multiple modulations for transmission, and is generally used in software-defined radio (SDR) devices. To improve the throughput and reliability of communication, automatic modulation classification (AMC) has become an essential topic in the research of Cognitive Radio (CR). AMC is a technique to identify the modulation scheme of the received radio signals without any transmission parameters. The essence of AMC is a classification problem, so some deep learning methods have been widely explored in recent years. However, most of the deep neural networks (DNNs) are trained offline with simulated radio signals, which is not practical enough for real-world applications.

Wireless communications are used extensively in many applications, including commercial, military, and space. Signal transmissions can be made significantly more efficient by utilizing modulation techniques. There are many different modulation approaches including PSK, FSK, and QAM. Given the limited radio spectrum available, it is important to use modulation techniques to squeeze the most information in the least amount of spectrum. Due to the widespread use of radio communications and due to different types of interference, transmitters often hop between different types of modulations. This technique is called link adaptive (LA), also known as adaptive modulation and coding. The transmitter would select the most appropriate modulation scheme according to the current transmission channel condition.

For example, the transmitter would select the modulation scheme of PSK in which the data would be modulated onto the wireless communication signal via the type of modulation of PSK and the data would be encoded into symbols from the modulation scheme of PSK. The conventional receiver in adaptive modulation and coding requires to pre-emptively know what type of modulation in which the data is modulated onto the wireless transmission signal in in order to decipher/demodulate the data in the incoming wireless communication signal.

A previous solution to pre-emptively classify the type of modulation in which the data is modulated onto the wireless communication signal for the conventional receiver was for the transmitter to include modulation information in each transmitted data frame of the wireless communication signal, so the conventional receiver would be notified of the current modulation type. The conventional receiver would then be able to classify the current modulation type of the wireless communication signal despite any noise that deviates the wireless communication signal as the current modulation type occupies bandwidth in the transmitted data frame of the wireless communication signal. As a result, the conventional receiver would be able to demodulate the wireless communication signal and decode the data as the current modulation type is classified by the conventional receiver due to the current modulation type transmitted with the wireless communication signal. However, this would reduce the efficiency of spectrum usage as allocating the modulation information into each transmitted data frame of the wireless communication signal occupies significant bandwidth during the transmission of the wireless communication signal that may be reduced if removed.

Automatic modulation classification (AMC) is another solution to this problem, where the conventional receiver will determine what type modulation was used without the transmitter sending the extra information. AMC is widely used in modern cognitive radio (CR) systems for dynamic spectrum access. In doing so, the conventional receiver may incorporate deep learning in order to classify the type of modulation in which data is modulated onto the wireless communication signal deviates due to the impact of noise as the wireless communication signal propagates from the transmitter to the conventional receiver without having to occupy each transmitted data frame the modulation information. However, the deep learning approach for the conventional receiver to classify the type of modulation in which the data is modulated as deviated from the impact of noise still requires that the deep learning models be trained offline in a pre-emptive manner.

In order to conduct offline training in a pre-emptive manner of the deep learning models to classify the type of modulation in which the data is modulated onto the wireless communication signal as deviated due to the impact of noise, each wireless communication signal with a different deviation due to the impact of noise is to be provided to the deep learning models. The deep learning modules may then be updated to identify such deviation due to the impact of noise in subsequent wireless communication signals that are transmitted. As a result, such deep learning models require significant samples of wireless communication signals with each wireless communication signal deviated in a different manner due to the impact of noise for the deep learning models to identify each wireless communication signal with a different deviation due to the impact of noise in subsequent wireless communication signals. Such significant quantity of samples would be significant and would still not encompass each possible deviation due to the impact of noise for each wireless communication signal that is transmitted thereby still resulting in the conventional receiver failing to classify modulations of wireless communication signals that are deviated by the impact of noise in a manner not previously trained by the deep learning models.

For example, the deep learning models for the conventional receiver may be pre-emptively provided with 1000 different wireless communication signals in which each type of modulation for each of the 1000 different wireless communication signals is deviated in a different manner due to the impact of noise. Each of the 1000 different wireless communication signals each deviated differently from the impact of noise would have to be pre-emptively predicted and/or generated based on previously transmitted wireless communication signals. In doing so, the type of modulation for the modulation of each of the 1000 different wireless communication signals as each deviated differently due to the impact of noise would have to be pre-emptively identified and then provided to the deep learning models for training such that the deep learning models may subsequently classify the types of modulation for the 1000 different wireless communication signals as subsequently received by the conventional receiver.

Thus, offline training in a pre-emptive manner of the deep learning models may enable the conventional receiver to classify each type of modulation for each modulation that is deviated by the impact of noise that is presented to the deep learning models for such offline training. However, the quantity of different deviations for each wireless communication signal that is transmitted caused by the impact of noise may be numerous as the noise may be generated by numerous different factors and parameters in which any combination of different factors and parameters may trigger a different impact of noise on the wireless communication signals. The offline training in a pre-emptive manner of the deep learning models for the conventional receiver to classify each possible deviation in the modulation of the wireless communication signal as impacted by noise may simply not be possible. As result, the offline training in a pre-emptive manner of the deep learning models of eh conventional receiver may still result in the conventional receiver failing to classify numerous other modulations of data onto the wireless transmission signal based on deviations impacted by the noise that have yet to be provided for offline training in a pre-emptive manner for the conventional receiver.

At present, the conventional approach is to use artificial intelligence approaches for automatic modulation classification. Many studies have explored using conventional deep learning to do automatic modulation classification. These deep learning networks are generally trained on a large sample of received signals for the different modulations that would need to be classified. Typically, the training set consists of signals that are distorted under various types of noise so that the final network is able to classify the modulation under different real world conditions. However, it is difficult, or possibly impossible to generate a dataset that has practically all the different types of noise and distortions that might be eventually encountered by the trained network.

A receiver 110 may receive a sequenced modulation signal from a transmitter. The sequenced modulation signal is partitioned into a plurality of modulations with each modulation partitioned in sequence to identify each type of modulation that each signal transmitted from the transmitter to the receiver 110 is modulated. A modulation classifier 130 may classify each modulation for each signal transmitted from the transmitter to the receiver 110 in the sequenced modulation signal into a corresponding modulation class based on a modulation classifier neural network 140 that identifies each type of modulation that each signal transmitted from the transceiver to the receiver is modulated from the sequenced modulation signal. The sequenced modulation signal that is received by the modulation classifier 130 is deviated from when initially transmitted by the transmitter based on noise that impacts the sequenced modulation signal as the sequenced modulation signal propagates from the transmitter.

A demodulator 160 may determine a modulation class associated with a received signal that is transmitted from the transmitter based on the modulation class as classified by the modulation classifier neural network 140 from the sequenced modulation signal that corresponds to the received signal. The received signal that is received by the demodulator 160 is deviated from when initially transmitted by the transmitter based noise that impacts the received signal as the received signal propagates from the transmitter. The demodulator 160 may demodulate the received signal by decoding each symbol included in the received signal based on the determined modulation class of the received signal. The determined modulation class identifies each symbol of the type of modulation in the determined modulation class that corresponds to each symbol included in the received signal thereby enabling each symbol in the received signal to be decoded when deviated by noise.

Figure 2A:
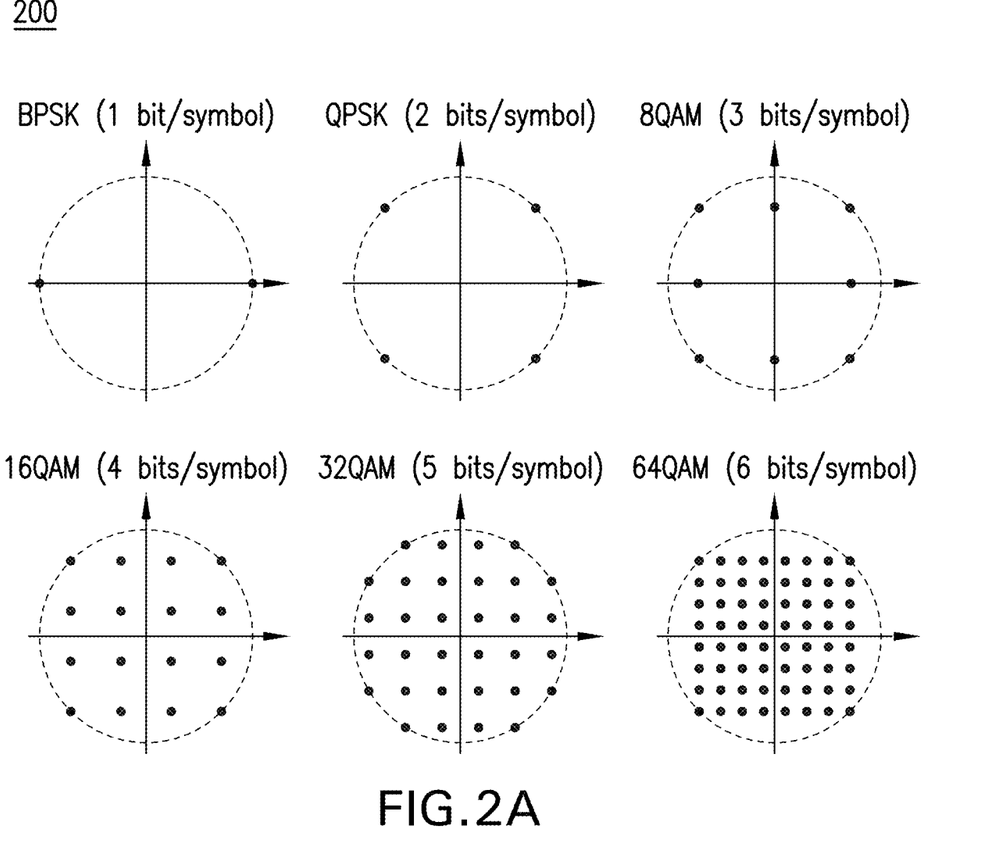
FIG. 2A is a schematic illustration of an exemplary symbol configuration of symbols configured in different modulation classes in accordance with an embodiment of the disclosure.
Figure 2B:
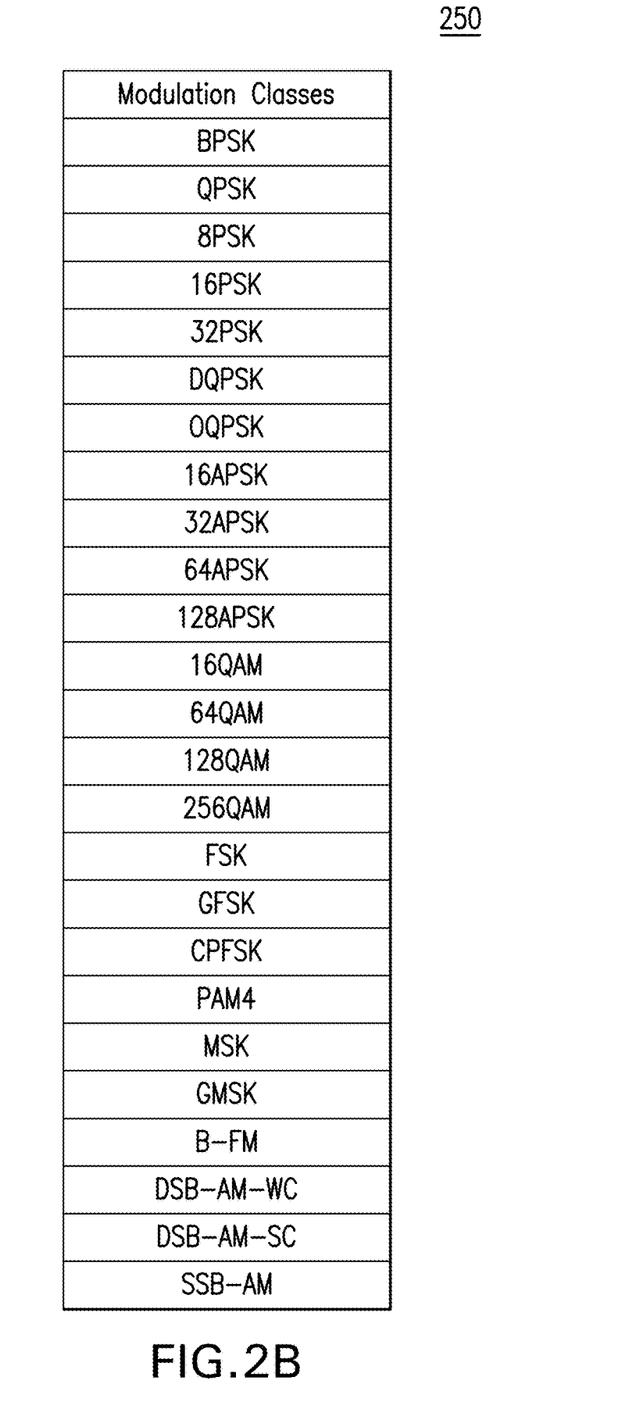
FIG. 2B is a schematic illustration of an exemplary modulation class configuration that identifies the different modulation classes in accordance with an embodiment of the disclosure.

Referring to FIG. 2A, an example symbol configuration 200 of symbols configured in different modulation classes is depicted. Referring to FIG. 2B, a modulation class configuration 250 is depicted that identifies the different modulation classes. The modulation classifier 130 may identify each modulation that is partitioned from the sequenced modulation signal transmitted from the transmitter based on a corresponding identifier that precedes each modulation as partitioned in the sequenced modulation signal. Each corresponding identifier provides a notification that the modulation is being transmitted subsequent to the preceding identifier as included in the sequenced modulation signal relative to each other modulation that is being transmitted in the sequenced modulation signa. The modulation classifier 130 may label each modulation as received from the transmitter in the sequenced modulation signal with the type of modulation for each received modulation based on the corresponding identifier that precedes each modulation in the sequenced modulation signal.

Figure 3:
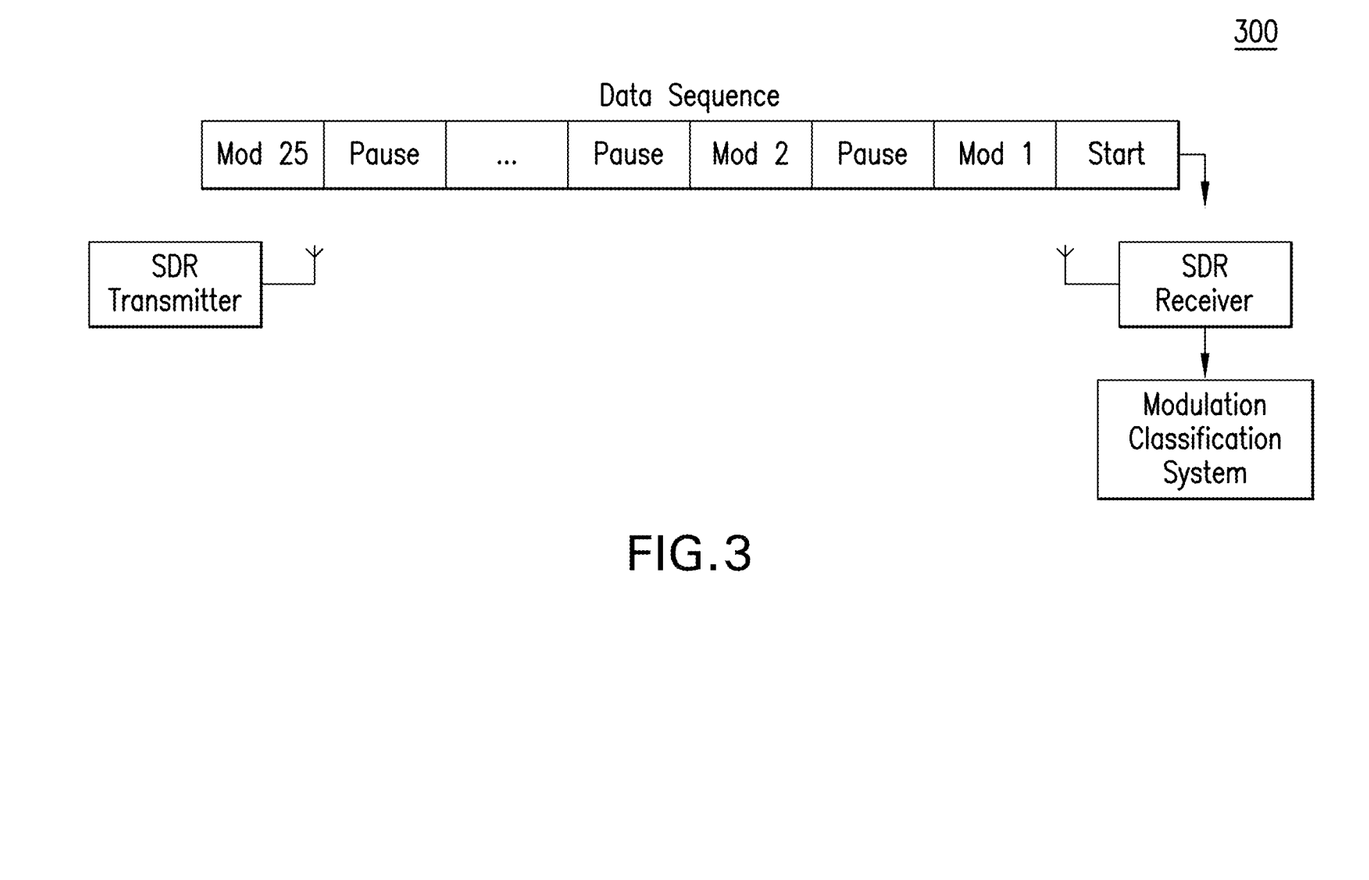
FIG. 3 is a schematic illustration of an exemplary sequenced modulation signal configuration in accordance with an embodiment of the disclosure.

Referring to FIG. 3, a sequenced modulation signal configuration 300 is depicted. The modulation classifier 130 may identify each modulation from the plurality of modulations as partitioned into the sequenced modulation signal as transmitted from the transmitter. The modulation classifier may match each identifier that precedes each modulation as transmitted in the sequenced modulation signal to a pre-determined identifier that identifies each modulation included in a dictionary of modulations. The dictionary of modulations includes each type of modulation that the transmitter is capable of transmitting thereby enabling each identifier that precedes each modulation as transmitted in the sequenced modulation signal to be matched to each corresponding pre-determined identifier that identifies each corresponding modulation in the dictionary of modulations.

The modulation classifier may label each modulation as received from the transmitter in the sequenced modulation signal with each type of modulation based on the match of each identifier that precedes each modulation as transmitted in the sequenced modulation signal to the corresponding pre-determined identifier. The corresponding pre-determined identifier may identify each corresponding modulation included in the dictionary of modulations thereby enabling each type of modulation that the transmitter is capable of transmitting to be classified.

The modulation classifier 130 may provide each modulation received from the transmitter in the sequenced modulation signal as labelled based on matching the received modulation to the dictionary of modulations to the modulation classifier neural network 140. The modulation classifier neural network 140 may determine each deviation between each modulation received from the transmitter in the sequenced modulation signal from each corresponding modulation identified in the dictionary of modulations based on the label of each modulation in the sequenced modulation signal. The deviation between each modulation in the sequenced modulation signal from each corresponding modulation identified in the dictionary of modulations is caused by noise impacting the sequenced modulation signal as the sequenced modulation signal propagates from the transmitter.

The modulation classifier 130 may correlate each modulation received from the transmitter in the sequenced modulation signal as deviated from noise impacting the sequenced modulation signal to each corresponding modulation identified in the dictionary of modulations. The modulation classifier 130 may correlate each modulation received from the transmitter based on the deviation between each modulation in the sequenced modulation signal from each corresponding modulation identified in the dictionary of modulations as determined by the modulation classifier neural network 140. The modulation classifier neural network 140 associates each modulation received in the sequenced modulation signal that is deviated from noise to each corresponding modulation identified in the dictionary of modulations based on the label of each modulation in the sequenced modulation signal.

The modulation classifier 130 may classify each type of modulation for each modulation received from the transmitter in the sequenced modulation signal that is deviated from noise impacting the sequenced modulation signal into the corresponding modulation class. The modulation classifier 130 my classify each type of modulation for each modulation received from the transmitter based on the corresponding modulation identified in the dictionary of modulations that is correlated to each modulation in the sequenced modulation signal that is deviated from noise.

The demodulator 160 may identify a symbol type associated with a plurality of symbols as included in the received signal based on a label that identifies the modulation class associated with the received signal as determined by the modulation classifier neural network 140 based on the dictionary of modulations. The label that identifies the modulation class of the received signal is indicative of the symbol type associated with the plurality of symbols that corresponds to the modulation of the received signal.

The demodulator 160 may demodulate the received signal by decoding each symbol included in the received signal based on the symbol type associated with each symbol as identified based on the label that identifies the modulation class associated with the received signal from when each symbol included in the received signal is deviated by noise. The label that identifies the modulation class associated with the received signal enables the symbol type associated with each symbol to be identified when each symbol included in the received signal is deviated by noise thereby enabling each symbol to be decoded when deviated by noise.

The demodulator 160 may provide the plurality of symbols included in the received signal received from the transmitter that corresponds to the modulation class as labelled by the modulation classifier neural network 140 based on the dictionary of modulations to the demodulator neural network 150. The demodulator 160 may determine from the demodulator neural network 150 each deviation between the plurality of symbols received from the transmitter in the received signal from a corresponding symbol type identified in the dictionary of modulations of the modulation associated with the plurality of symbols included in the received signal. The deviation between the plurality of symbols included in the received signal from the corresponding symbol type identified in the dictionary of modulations is caused by noise impacting the received signal as the received signal propagates from the transmitter.

The demodulator 160 may correlate the plurality of symbols received from the transmitter in the received signal as deviated from noise impacting the received signal to the corresponding symbol type identified in the dictionary of modulations based on the label of the modulation associated with the plurality of symbols included in the received signal as determined by the demodulator neural network 150. The demodulator neural network 150 associates the plurality of symbols received in the received signal that is deviated from noise to the corresponding symbol type identified in the dictionary of modulations base on the label of the modulation associated with the plurality of symbols included in the received signal. The demodulator 160 may determine each symbol from the plurality of symbols received from the transmitter in the received signal that is deviated from noise impacting the received signal based on the corresponding symbol type correlated to each symbol as identified in the dictionary of modulations based on the label of the modulation associated with the plurality of symbols included in the received signal.

The demodulator 160 may associate the deviation between the plurality of symbols received from the transmitter in the received signal to the corresponding symbol type identified in the dictionary of modulations based on the label of the modulation associated with the plurality of symbols included in the received signal as determined by the demodulator neural network 150. The demodulator 160 may update a plurality of demodulator weights included in the demodulator neural network 150 to correlate the plurality of symbols received from the transmitter in the received signal as deviated from noise impacting the received signal to the corresponding signal type identified in the dictionary of modulations based on the label of the modulation associated with the plurality of symbols included in the received signal thereby training the demodulator neural network 150 to enable decoding for each plurality of symbols that is subsequently received from the transmitter in a subsequent received signal that is deviated from noise impacting the subsequent received signal.

The end-to-end DNN based receiver 100 may be implemented such that the transmitter periodically sends out a known ordered sequence of signals of all the modulations to be used by the transmitter. This sequence is known to the end-to-end DNN based receiver 100 such that the end-to-end DNN based receiver 100 may identify the known ordered sequence by preceding the known ordered sequence with an identifiable signal pattern and/or transmitting the sequence at known times. The end-to-end DNN based receiver 100 may know how to label all the received signals of different modulations as the end-to-end DNN based receiver 100 may know the transmission order and thus can use this received signal to train an artificial intelligence algorithm, such as a CNN. As this received training dataset reflects the current signal propagation environment, a network trained on this dataset may have better accuracy at AMC than a pretrained network. The end-to-end DNN based receiver 100 may go beyond modulation detection, and use deep learning for data demodulation also.

Thus, the end-to-end DNN based receiver 100 may train the network in the real world under the actual conditions that are being encountered. The transmitter may periodically transmit a series of signals with all the modulations that the transmitter could use that is a dictionary of modulations. The end-to-end DNN based receiver 100 may know when to expect this dictionary transmission. This could be achieved by transmitting the dictionary at known times or after known intervals. Alternatively, an easy to identify signal could be transmitted before the dictionary is transmitted. Both approaches could be used together. The order and duration of modulation transmissions may be known to the end-to-end DNN based receiver 100 so that the end-to-end DNN based receiver 100 knows how to label the received dictionary of signals. Once the dictionary is received, the end-to-end DNN based receiver 100 would train an artificial intelligence algorithm (such as a deep learning network) to recognize the different modulations in the received dictionary. By periodically retraining the artificial intelligence algorithm on the end-to-end DNN based receiver 100, the end-to-end DNN based receiver 100 may be able to adapt to a larger variety of noise and distortions than a pretrained algorithm.

Once the dictionary of all modulation classes is received, the data would be sent to the modulation classifier 130 for training and inference. Each data point is a complex number, represented as an I/Q value. The number of received signal data points in each training data sample could be adjusted to a value that provides the best training performance. Once the data points in each sample are determined, they are normalized within each sample. The training label is also generated based on the same transmission order.

The environment in which signals are transmitted could change over time due to noise or distortion. This could be due to many reasons including the presence of obstacles, attenuation from the environment, and interference from other transmitters. Furthermore, data signals of the same modulation type have data streams that look significantly different over time. This is because many channel impairments may be applied to the signal between the transmitter and receiver that may add noise, or slight delays or frequency shifts. Thus, a QPSK signal transmitted one day may look too different from a new QPSK data stream for a predefined system to recognize. The end-to-end DNN based receiver 100 may collect the dictionary of transmitted data and determine the type of modulation without help from a human user.

The end-to-end DNN based receiver 100 is capable of retraining over time to ensure that signal modulations are always recognized correctly no matter what the transmission conditions are. This is done by periodically retraining the neural network for each scenario to ensure it is ready for new data streams. This is also done without human interaction, leading to a powerful autonomous SDR system.

Additionally, online learning could be used for demodulation as well. A conventional approach of online learning for demodulation was limited to one modulation type (BPSK) and did not look at automatic modulation classification. The end-to-end DNN based receiver 100 may implement demodulation such that demodulation could be combined with automatic modulation classification and both could be achieved with one dictionary transmission at the transmitter. This could be done by using one network that could do both demodulation and modulation classification or by using separate networks for demodulation and modulation classification. FIG. 1 depicts the end-to-end DNN based receiver 100 for doing both demodulation and modulation classification.

Figure 4:
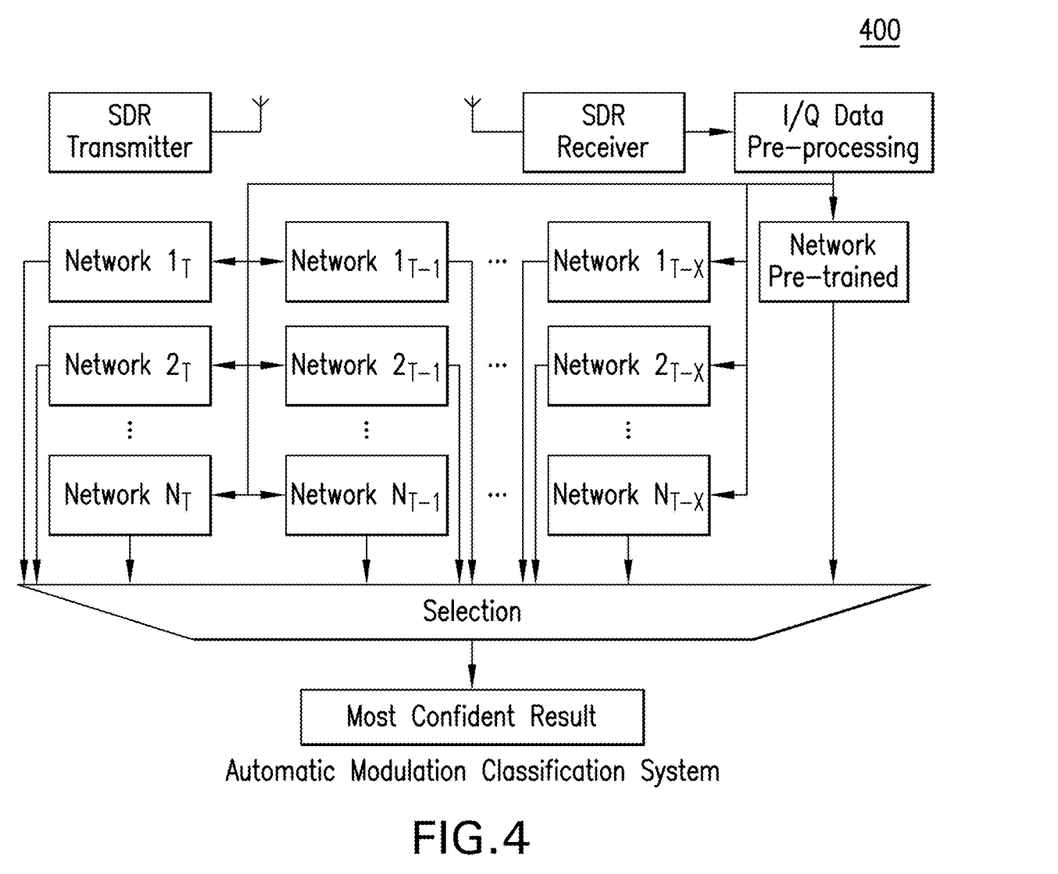
FIG. 4 is a schematic illustration of a detailed analog neuromorphic liquid state configuration in accordance with an embodiment of the disclosure.

In one embodiment, FIG. 4 depicts an automatic modulation classification system 400 that implements one or more neural networks to learn the transmitted radio signal online. The received modulated signal is a sequence containing the different types of modulations the SDR system could use. The data preprocessing block takes the raw I/Q data and creates training samples as well as labels. The processed data and labels are used for inference by the pretrained network. Additionally, a new network will be initialized and trained with the data. Then the network may be saved also for inference. As the transmission condition/environment changes, the signals arriving at the receiver will change. Thus, the networks may need to be retrained. Previous training data could be kept to allow the system to fall back on prior networks in case transmission conditions change back to their prior state. This is represented in FIG. 4 by the network subscripts Network $X_y$, where Y represents the network trained at the Yth time.

Multiple types of online training algorithms may be implemented. In FIG. 4, Network 1 to Network N represent N different learning algorithms. A convolutional neural network (CNN) with custom residual blocks may be implemented. Other algorithms that could be used in the system for faster training speed include, a hybrid algorithm with Principal Component Analysis (PCA)+F-transform. This is faster and could achieve a higher success rate than a standard CNN. In FIG. 4, this hybrid network could be Network 2, while Network 1 could be a CNN.

In FIG. 4, Network $X_y$ stands for the Xth type of training algorithm based network, trained at the Yth time slot. Thus, Network $2_{T-1}$ is the previously (ie T-1) trained version of Network 2. A limit to the number of previously trained networks that would be retained may be identified. All of the online trained and pre-trained networks could be consulted for a modulation classification. The selection unit in FIG. 4 may select the most confident classification. The simplest embodiment includes only one online trained network (ie. only Network 1T in FIG. 4), and optionally, one pre-trained network.

It is to be appreciated that the Detailed Description section, and not the Abstract section, is intended to be used to interpret the claims. The Abstract section can set forth one or more, but not all exemplary embodiments, of the present disclosure, and thus, is not intended to limit the present disclosure and the appended claims in any way.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in art. The invention in its broader aspects is therefore not limited to the specific details, representative apparatus and method and illustrative examples shown and described. Accordingly, departures may be made from such details without departing from the scope of the general inventive concept.

What is claimed is:

1. A modulation classification and demodulation system the implements a neural network for transmission of a wireless communication signal, comprising:
  a modulation classifier configured to:
    receive a sequenced modulation signal from a transmitter, wherein the sequenced modulation signal is partitioned into a plurality of modulations with each modulation partitioned in sequence to identify each type of modulation that each signal transmitted from the transmitter to the receiver is modulated,
    classify each type of modulation for each signal transmitted from the transmitter to the receiver in the sequenced modulation signal into a corresponding modulation class based on a modulation classifier neural network that identifies each type of modulation that each signal transmitted from the transceiver to the receiver is modulated from the sequenced modulation signal, wherein the sequenced modulation signal that is received by the modulation classifier is deviated from when initially transmitted by the transmitter based on noise that impacts the sequenced modulation signal as the sequenced modulation signal propagates from the transmitter; and
  a demodulator configured to:
    determine a modulation class associated with a received signal that is transmitted from the transmitter based on the modulation class as classified by the modulation classifier neural network from the sequenced modulation signal that corresponds to the received signal, wherein the received signal that is received by the demodulator is deviated from when initially transmitted by the transmitter based on noise that impacts the received signal as the received signal propagates from the transmitter, and
    demodulate the received signal by decoding each symbol included in the received signal based on the determined modulation class of the received signal, wherein the determined modulation class identifies each symbol of the type of modulation in the determined modulation class that corresponds to each symbol included in the received signal thereby enabling each symbol in the received signal to be decoded when deviated by noise.

2. The modulation classification and demodulation system of claim 1, wherein the modulation classifier is further configured to:
  identify each modulation that is partitioned from the sequenced modulation signal transmitted from the transmitter based on a corresponding identifier that precedes each modulation as partitioned in the sequenced modulation signal, wherein each corresponding identifier provides a notification that the modulation is being transmitted subsequent to the preceding identifier as included in the sequenced modulation signal relative to each other modulation that is being transmitted in the sequenced modulation signal; and
  label each modulation as received from the transmitter in the sequenced modulation signal with the type of modulation for each received modulation based on the corresponding identifier of that precedes each modulation in the sequenced modulation signal.

3. The modulation classification and demodulation system of claim 2, wherein the modulation classifier is further configured to:
  identify each modulation from the plurality of modulations as partitioned into the sequenced modulation signal as transmitted from the transmitter by matching each identifier that precedes each modulation as transmitted in the sequenced modulation signal to a pre-determined identifier that identifies each modulation included in a dictionary of modulations, wherein the dictionary of modulations includes each type of modulation that the transmitter is capable of transmitting thereby enabling each identifier that precedes each modulation as transmitted in the sequenced modulation signal to be matched to each corresponding pre-determined identifier that identifies each corresponding modulation included in the dictionary of modulations; and
  label each modulation as received from the transmitter in the sequenced modulation signal with each type of modulation based on the match of each identifier that precedes each modulation as transmitted in the sequenced modulation signal to the corresponding pre-determined identifier that identifies each corresponding modulation included in the dictionary of modulations thereby enabling each type of modulation that the transmitter is capable of transmitting to be classified.

4. The modulation classification and demodulation system of claim 3, wherein the modulation classifier is further configured to:
  provide each modulation received from the transmitter in the sequenced modulation signal as labelled based on matching the received modulation to the dictionary of modulations to the modulation classifier neural network; and
  determine from the modulation classifier neural network each deviation between each modulation received from the transmitter in the sequenced modulation signal from each corresponding modulation identified in the dictionary of modulations based on the label of each modulation in the sequenced modulation signal, wherein the deviation between each modulation in the sequenced modulation signal from each corresponding modulation identified in the dictionary of modulations is caused by noise impacting the sequenced modulation signal as the sequenced modulation signal propagates from the transmitter.

5. The modulation classification and demodulation system of claim 4, wherein the modulation classifier is further configured to:
  correlate each modulation received from the transmitter in the sequenced modulation signal as deviated from noise impacting the sequenced modulation signal to each corresponding modulation identified in the dictionary of modulations based on the deviation between each modulation in the sequenced modulation signal from each corresponding modulation identified in the dictionary of modulations as determined by the modulation classifier neural network, wherein the modulation classifier neural network associates each modulation received in the sequenced modulation signal that is deviated from noise to each corresponding modulation identified in the dictionary of modulations based on the label of each modulation in the sequenced modulation signal; and classify each type of modulation for each modulation received from the transmitter in the sequenced modulation signal that is deviated from noise impacting the sequenced modulation signal into the corresponding modulation class based on the corresponding modulation identified in the dictionary of modulations that is correlated to each modulation in the sequenced modulation signal that is deviated from noise.

6. The modulation classification and demodulation system of claim 5, wherein the modulation classifier is further configured to:

associate each deviation between each modulation received from the transmitter in the sequenced modulation signal to each corresponding modulation from each corresponding modulation identified in the dictionary of modulations as determined by the modulation classification neural network with each corresponding modulation class that each modulation in the sequenced modulation signal is classified; and update a plurality of classifier weights included in the modulation classifier neural network to correlate each modulation received from the transmitter in the sequenced modulation signal as deviated from noise impacting the sequenced modulation signal to each corresponding modulation identified in the dictionary of modulations thereby training the modulation classifier neural network to enable classification of each type of modulation for each modulation that is subsequently received from the transmitter in a subsequent sequenced modulation signal that is deviated from noise impacting the subsequent sequenced modulation signal.

7. The modulation classification and demodulation system of claim 6, wherein the demodulator is further configured to:

identify a symbol type associated with a plurality of symbols as included in the received signal based on a label that identifies the modulation class associated with the received signal as determined by the modulation classifier neural network based on the dictionary of modulations, wherein the label that identifies the modulation class of the received signal is indicative of the symbol type associated with the plurality of symbols that corresponds to the modulation of the received signal; and demodulate the received signal by decoding each symbol included in the received signal based on the symbol type associated with each symbol as identified based on the label that identifies the modulation class associated with the received signal from the when each symbol included in the received signal is deviated by noise, wherein the label that identifies the modulation class associated with the received signal enables the symbol type associated with each symbol to be identified when each symbol included in the received signal is deviated by noise thereby enabling each symbol to be decoded when deviated by noise.

8. The modulation classification and demodulation system of claim 7, wherein the demodulator is further configured to:

provide the plurality of symbols included in the received signal received from the transmitter that corresponds to the modulation class as labelled by the modulation classifier neural network based on the dictionary of modulations to a demodulator neural network; and determine from the demodulator neural network each deviation between the plurality of symbols received from the transmitter in the received signal from a corresponding symbol type identified in the dictionary of modulations based on the label of the modulation associated with the plurality of symbols included in the received signal, wherein the deviation between the plurality of symbols included in the received signal from the corresponding symbol type identified in the dictionary of modulations is caused by noise impacting the received signal as the received signal propagates from the transmitter.

9. The modulation classification and demodulation system of claim 8, wherein the demodulator is further configured to:

correlate the plurality of symbols received from the transmitter in the received signal as deviated from noise impacting the received signal to the corresponding symbol type identified in the dictionary of modulations based on the label of the modulation associated with the plurality of symbols included in the received signal as determined by the demodulator neural network, wherein the demodulator neural network associates the plurality of symbols received in the received signal that is deviated from noise to the corresponding symbol type identified in the dictionary of modulations based on the label of the modulation associated with the plurality of symbols included in the received signal; and determine each symbol from the plurality symbols received from the transmitter in the received signal that is deviated from noise impacting the received signal based on the corresponding symbol type correlated to each symbol as identified in the dictionary of modulations based on the label of the modulation associated with the plurality of symbols included in the received signal.

10. The modulation classification and demodulation system of claim 9, wherein the demodulator is further configured to:

associate the deviation between the plurality of symbols received from the transmitter in the received signal to the corresponding symbol type identified in the dictionary of modulations based on the label of the modulation associated with the plurality of symbols included in the received signal as determined by the demodulator neural network; and update a plurality of demodulator weights included in the demodulator neural network to correlate the plurality of symbols received from the transmitter in the received signal as deviated from noise impacting the received signal to the corresponding symbol type identified in the dictionary of modulations based on the label of the modulation associated with the plurality of symbols included in the received signal thereby training the demodulator neural network to enable decoding for each plurality of symbols that is subsequently received from the transmitter in a subsequent received signal that is deviated from noise impacting the subsequent received signal.

11. A method for modulation classification and demodulation that implements a neural network for transmission of a wireless communication signal, comprising:

receiving a sequenced modulation signal from a transmitter, wherein the sequenced modulation signal is partitioned into a plurality of modulations with each modulation partitioned in sequence to identify each type of modulation that each signal transmitted from the transmitter to receiver is modulated;

classifying each type of modulation for each signal transmitted from the transmitter to the receiver in the sequenced modulation signal into a corresponding modulation class based on a modulation classifier neural network that identifies each type of modulation that each signal transmitted form the transceiver to the receiver is modulated from the sequenced modulation signal, wherein the sequenced modulation signal that is received by the modulation classifier is deviated from when initially transmitted by the transmitter based on noise that impacts the sequenced modulation signal as the sequenced modulation signal propagates from the transmitter;

determining a modulation class associated with a received signal that is transmitted from the transmitter based on the modulation class as classified by the modulation classifier neural network from the sequenced modulation signal that corresponds to the received signal, wherein the received signal that is received by the demodulator is deviated from when initially transmitted by the transmitter based on noise that impacts the received signal as the received signal propagates from the transmitter; and demodulating the received signal by decoding each symbol included in the received signal based on the determined modulation class of the received signal, wherein the determined modulation class identifies each symbol of the type of modulation in the determined modulation class that corresponds to each symbol included in the received signal thereby enabling each symbol in the received signal to be decoded when deviated by noise.

12. The method of claim 11, wherein the classifying comprises:

identifying each modulation that is partitioned from the sequenced modulation signal transmitted from the transmitter based on a corresponding identifier that precedes each modulation as partitioned in the sequenced modulation signal, wherein each corresponding identifier provides a notification that the modulation is being transmitted subsequent to the preceding identifier as included in the subsequent modulation signal relative to each other modulation that is being transmitted in the sequenced modulation signal; and labelling each modulation as received from the transmitter in the sequenced modulation signal with the type of modulation for each received modulation based on the corresponding identifier that precedes each modulation in the sequenced modulation signal.

13. The method of claim 12, wherein the classifying further comprises:

identifying each modulation from the plurality of modulations as partitioned into the sequenced modulation signal as transmitted from the transmitter by matching each identifier that precedes each modulation as transmitted in the sequenced modulation signal to a pre-determined identifier that identifies each modulation included in a dictionary of modulations, wherein the dictionary of modulations includes each type of modulation that the transmitter is capable of transmitting thereby enabling each identifier that precedes each modulation as transmitted in the sequenced modulation signal to be matched to each corresponding pre-determined identifier that identifies each corresponding modulation included in the dictionary of modulations; and labelling each modulation as received from the transmitter in the sequenced modulation signal with each type of modulation based on the match of each identifier that proceeds each modulation as transmitted in the sequenced modulation signal to the corresponding pre-determined identifier that identifies each corresponding modulation included in the dictionary of modulations thereby enabling each type of modulation that the transmitter is capable of transmitting to be classified.

14. The method of claim 13, wherein the classifying further comprises:

providing each modulation received from the transmitter in the sequenced modulation signal as labelled based on matching the received modulation to the dictionary of modulations to the modulation classifier neural network; and determining from the modulation classifier neural network each deviation between each modulation received from the transmitter in the sequenced modulation signal from each corresponding modulation identified in the dictionary of modulations based on the label of each modulation in the sequenced modulation signal, wherein the deviation between each modulation in the sequenced modulation signal from each corresponding modulation identified in the dictionary of modulations is caused by noise impacting the sequenced modulation signal as the sequenced modulation signal propagates from the transmitter.

15. The method of claim 14, wherein the classifying further comprises:

correlating each modulation received from the transmitter in the sequenced modulation signal as deviated from noise impacting the sequenced modulation signal to each corresponding modulation identified in the dictionary of modulations based on the deviation between each modulation in the sequenced modulation signal from each corresponding modulation identified in the dictionary of modulations as determined by the modulation classifier neural network, wherein the modulation classifier neural network associates each modulation received in the sequenced modulation signal that is deviated from noise to each corresponding modulation identified in the dictionary of modulations based on the label of each modulation in the sequenced modulation signal; and classifying each type of modulation for each modulation received from the transmitter in the sequenced modulation signal that is deviated from noise impacting the sequenced modulation signal into the corresponding modulation class based on the corresponding modulation identified in the dictionary of modulations that is correlated to each modulation in the sequenced modulation signal that is deviated from noise.

16. The method of claim 15, wherein the classifying further comprises:

associating each deviation between each modulation received from the transmitter in the sequenced modulation signal to each corresponding modulation from each corresponding modulation identified in the dictionary of modulations as determined by the modulation classification neural network with each corresponding modulation class that each modulation in the sequenced modulation signal is classified; and updating a plurality of classifier weights included in the modulation classifier neural network to correlate each modulation received from the transmitter in the sequenced modulation signal as deviated from noise impacting the sequenced modulation signal to each corresponding modulation identified in the dictionary of modulations thereby training the modulation classifier neural network to enable classification of each type of modulation for each modulation that is subsequently received from the transmitter in a subsequent sequenced modulation signal that is deviated from noise impacting the subsequent sequenced modulation signal.

17. The method of claim 16, further comprising:

identifying a symbol associated with a plurality of symbols as included in the received signal based on a label that identifies the modulation class associated with the received signal as determined by the modulation classifier neural network based on the dictionary of modulations, wherein the label that identifies the modulation class of the received signal is indicative of the symbol type associated with the plurality of symbols that corresponds to the modulation of the received signal; and demodulating the received signal by decoding each symbol included in the received signal based on the symbol type associated with each symbol as identified based on the label that identifies the modulation class associated with the received signal from when each symbol included in the received signal is deviated by noise, wherein the label that identifies the modulation class associated with the received signal enables the symbol type associated with each symbol to be identified when each symbol included in the received signal is deviated by noise thereby enabling each symbol to be decoded when deviated by noise.

18. The method of claim 17, further comprising:

providing the plurality of symbols included in the received signal received from the transmitter that corresponds to the modulation class as labelled by the modulation classifier neural network based on the dictionary of modulations to a demodulator neural network; and determining from the demodulator neural network each deviation between the plurality of symbols received from the transmitter in the received signal from a corresponding symbol type identified in the dictionary of modulations based on the label of the modulation associated with the plurality of symbols included in the received signal, wherein the deviation between the plurality of symbols included in the received signal from the corresponding symbol type identified in the dictionary of modulations is caused by noise impacting the received signal as the received signal propagates from the transmitter.

19. The method of claim 18, further comprising:

correlating the plurality of symbols received from the transmitter in the received signal as deviated from noise impacting the received signal to the corresponding symbol type identified in the dictionary of modulations based on the label of the modulation associated with the plurality of symbols included in the received signal as determined by the demodulator neural network, wherein the demodulator neural network associates the plurality of symbols received in the received signal that is deviated from noise to the corresponding symbol type identified in the dictionary of modulations based on the label of the modulation associated with the plurality of symbols included in the received signal; and determining each symbol from the plurality of symbols received from the transmitter in the received signal that is deviated from noise impacting the received signal based on the corresponding symbol type correlated to each symbol as identified in the dictionary of modulations based on the label of the modulation associated with the plurality of symbols included in the received signal.

20. The method of claim 19, further comprising:

associating the deviation between the plurality of symbols received from the transmitter in the received signal to the corresponding symbol type identified in the dictionary of modulations based on the label of the modulation associated with the plurality of symbols included in the received signal as determined by the demodulator neural network; and updating a plurality of demodulator weights included in the demodulator neural network to correlate the plurality of symbols received from the transmitter in the received signal a deviated from noise impacting the received signal to the corresponding symbol type identified in the dictionary of modulations based on the label of the modulation associated with the plurality of symbols included in the received signal thereby training the demodulator neural network to enable decoding for each plurality of symbols that is subsequently received from the transmitter in a subsequent received signal that is deviated from noise impacting the subsequent received signal.

* * * * *